United States Patent
Lee et al.

(10) Patent No.: US 8,107,392 B2
(45) Date of Patent: Jan. 31, 2012

(54) METHOD AND APPARATUS FOR PACKET AGGREGATION IN POWER LINE COMMUNICATION NETWORK

(75) Inventors: Ju-Han Lee, Suwon-si (KR); Ho-Jeong You, Suwon-si (KR); In-Hwan Kim, Suwon-si (KR); Seung-Gi Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 12/278,097

(22) PCT Filed: Nov. 6, 2006

(86) PCT No.: PCT/KR2006/004595
§ 371 (c)(1),
(2), (4) Date: Aug. 1, 2008

(87) PCT Pub. No.: WO2007/094547
PCT Pub. Date: Aug. 23, 2007

(65) Prior Publication Data
US 2009/0175190 A1 Jul. 9, 2009

(30) Foreign Application Priority Data
Feb. 16, 2006 (KR) .................. 10-2006-0015157

(51) Int. Cl.
*H04L 12/26* (2006.01)
(52) U.S. Cl. ...................................... 370/252
(58) Field of Classification Search ........... None
See application file for complete search history.

(56) References Cited

U.S. PATENT DOCUMENTS

| | | | |
|---|---|---|---|
| 6,347,091 B1 * | 2/2002 | Wallentin et al. | 370/437 |
| 7,443,804 B2 * | 10/2008 | Cheung et al. | 370/252 |
| 7,489,631 B2 * | 2/2009 | Ilan | 370/230.1 |
| 2002/0089935 A1 | 7/2002 | Chan et al. | |
| 2003/0108010 A1 | 6/2003 | Kim et al. | |
| 2004/0071096 A1 | 4/2004 | Na et al. | |
| 2004/0100991 A1 | 5/2004 | Samadi et al. | |
| 2005/0163059 A1 * | 7/2005 | Dacosta et al. | 370/252 |
| 2006/0072615 A1 * | 4/2006 | Narad et al. | 370/474 |
| 2007/0025386 A1 * | 2/2007 | Riedel et al. | 370/445 |
| 2007/0177626 A1 * | 8/2007 | Kotelba | 370/468 |
| 2009/0245260 A1 * | 10/2009 | Mohaban et al. | 370/392 |

* cited by examiner

*Primary Examiner* — Anh-Vu Ly
(74) *Attorney, Agent, or Firm* — Sughrue Mion, PLLC

(57) ABSTRACT

A method and apparatus for packet aggregation in a power line communication network (PLC) are provided. The method of aggregating packets includes: by performing a PLC channel estimation, determining whether or not a channel condition is good; if the channel condition is good, determining whether or not the data desired to be transmitted is suitable for packet aggregation according to the type of data; and if the channel condition is good and the data desired to be transmitted is suitable for the packet aggregation, aggregating packets of the data desired to be transmitted. Since a decision on whether or not to aggregate packets is determined according to a channel condition at a physical level and the type of data at an application level, packet aggregation can be performed in appropriate response to the frequently changing condition of a channel and the characteristic of the data desired to be transmitted.

5 Claims, 2 Drawing Sheets

METHOD AND APPARATUS FOR PACKET AGGREGATION IN POWER LINE COMMUNICATION NETWORK

CROSS-REFERENCE TO RELATED PATENT APPLICATIONS

This application is a National Stage Entry of PCT/KR2006/004595, filed on Nov. 6, 2006, which claims the benefit of Korean Patent Application No. 10-2006-0015157, filed on Feb. 16, 2006, in the Korean Intellectual Property Office, the disclosures of which are incorporated herein in their entirety by reference.

BACKGROUND OF THE INVENTION

1. Field of the Invention

The present invention relates to a power line communication (PLC), and more particularly, to a packet aggregation method and apparatus in a PLC network.

2. Description of the Related Art

A power line communication (PLC) network is one of a plurality of local communication networks. PLC technology uses existing power lines in houses. Accordingly, unlike Ethernet, a PLC network does not need additional wiring, and can be used in basements or shaded areas that wireless technology cannot reach.

Packets transmitted through a network include header information for transmission control, flow control and link control, in addition to data desired to be transmitted. This header information lowers the efficiency of data transmission through a network. To address this problem, a packet aggregation technique is used.

However, since it is difficult to apply an ordinary packet aggregation technique used in a wireless local area network (WLAN) directly to a PLC network, a packet aggregation technique suitable for a PLC network is needed.

SUMMARY OF THE INVENTION

The present invention provides a method and apparatus for packet aggregation that can be applied to a power line communication (PLC) network.

The present invention also provides a computer readable recording medium having embodied thereon a computer program for executing the packet aggregation method.

According to an aspect of the present invention, there is provided a method of aggregating packets in a power line communication (PLC) network including: by performing a PLC channel estimation, determining whether or not a channel condition is good; if the channel condition is good, determining whether or not the data desired to be transmitted is suitable for packet aggregation according to the type of data; and if the channel condition is good and the data desired to be transmitted is suitable for the packet aggregation, aggregating packets of the data desired to be transmitted.

According to another aspect of the present invention, there is provided an apparatus for packet aggregation in a power line communication (PLC) network, including: a channel condition determination unit that determines whether or not a channel condition is good by performing a PLC channel estimation; a data type determination unit that, if the channel condition is good, determines whether or not a data desired to be transmitted is suitable for packet aggregation according to the type of data; and a packet aggregation unit that aggregates packets of the data desired to be transmitted if the channel condition is good and the data desired to be transmitted is suitable for the packet aggregation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings, in which exemplary embodiments of the invention are shown.

Figure 1:
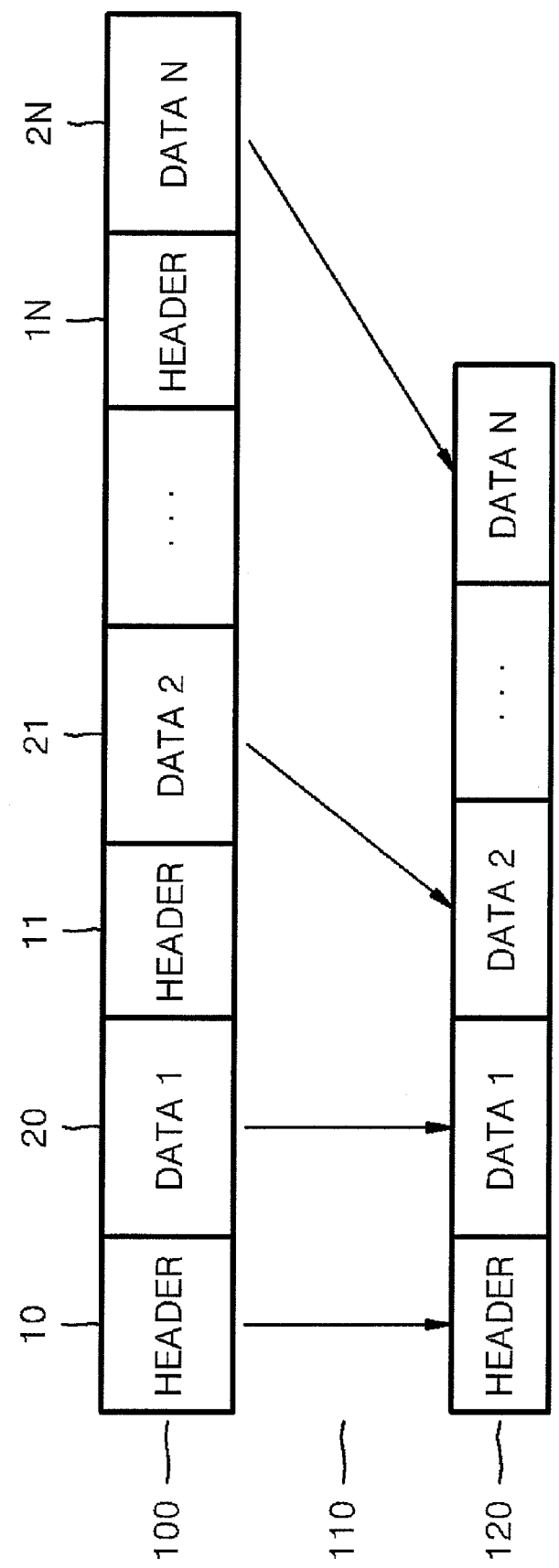
FIG. 1 illustrates an example of applying packet aggregation to data packets.

FIG. 1 illustrates an example of applying packet aggregation to data packets.

A medium access control (MAC) layer performs an important role in a network. MAC technology in a power line communication (PLC) network employs a carrier sense multiple access/collision avoidance (CSMA/CA) method in the same way as a wireless local area network (WLAN) does. That is, not only is data transmitted through a transmission medium, but also header information for transmission control, flow control, or link control is transmitted. For header information, a separate frame is used, or a separate field is assigned in a frame.

Frequent transfers of this header information lower an overall efficiency of the MAC layer. In order to enhance the data transmission efficiency of the MAC layer, packet aggregation is used.

Packet aggregation is performed as follows. Referring to FIG. 1, data packets having common header information 10 through 1N are collected in operation 100, and common headers 11 through 1N are removed in operation 110 leaving the first common header 10. Then, by sequentially connecting the collected data 20 through 2N to the common header 10, one data packet is generated in operation 120.

By performing packet aggregation, network resources required for repeatedly transmitting common header information can be saved.

Figure 2:
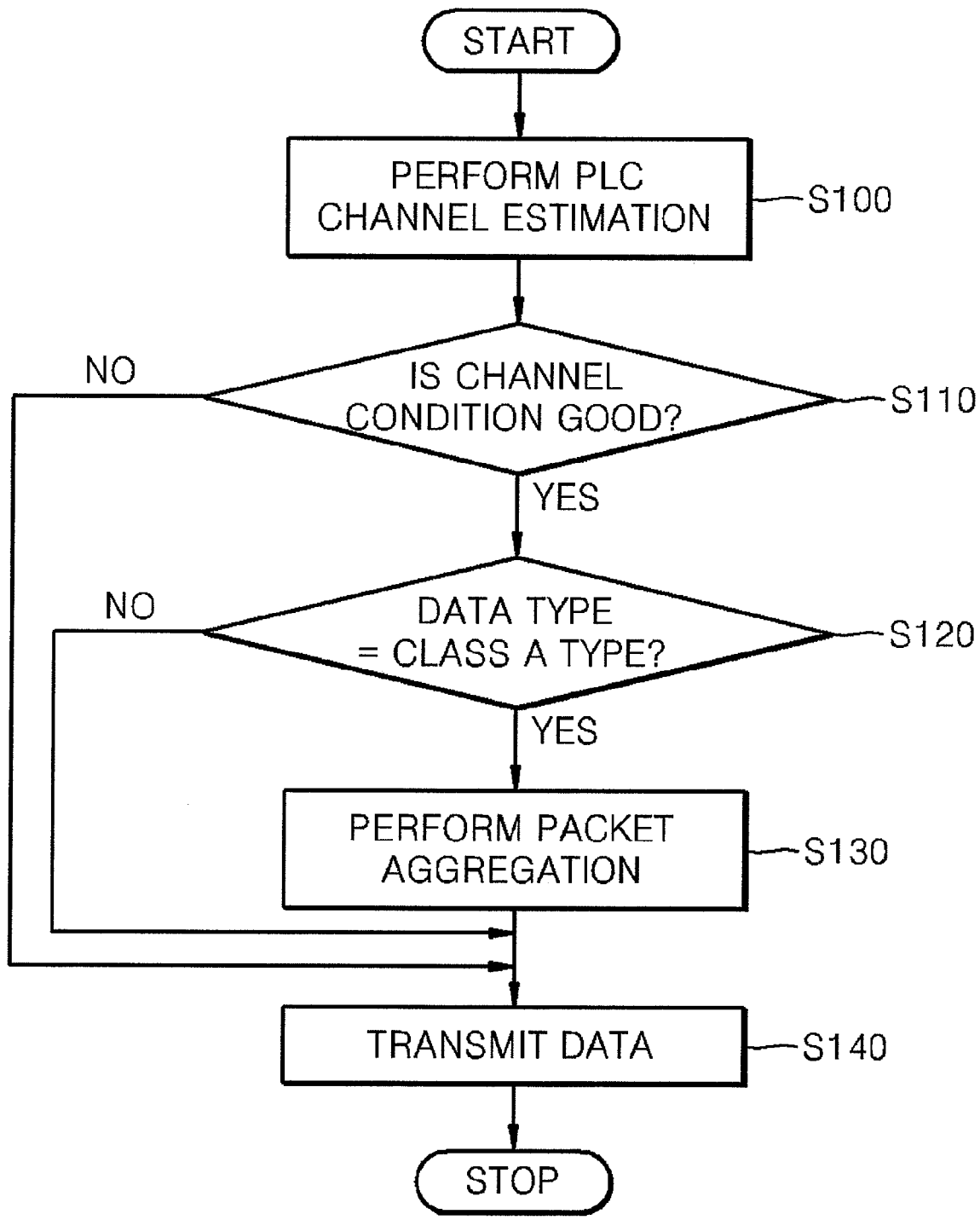
FIG. 2 is a flowchart illustrating a method of aggregating packets according to an embodiment of the present invention.

FIG. 2 is a flowchart illustrating a method of aggregating packets according to an embodiment of the present invention.

Generally, it is important to determine which packet the packet aggregation is applied to.

Uniform application of packet aggregation cannot guarantee quality of service (QoS). Since a required delay or bandwidth varies with respect to an application, it is inefficient to uniformly apply packet aggregation. Also, a channel condition changes frequently in a PLC environment. In the present invention, a packet aggregation method which selectively applies packet aggregation reflecting the characteristic of a channel and QoS requirement information of an application in a PLC network is suggested.

In the packet aggregation method according to the current embodiment of the present invention, two variables are considered. One is a channel condition at a physical (PHY) level, and the other is the characteristic of an application at an application level.

In order to identify a channel condition at the PHY level, channel estimation is performed in operation S100. By using the result of the channel estimation, it is determined whether or not the channel condition is good in operation S110.

In order to measure the channel condition at the PHY level, an available bandwidth of a channel is calculated by using a predetermined formula.

If an apparatus for performing the packet aggregation method according to the current embodiment of the present invention, that is, an apparatus performing PLC channel estimation, is using a channel, the available bandwidth of the channel is calculated by using the following equation 1:

$$B_{Rcv,i} \times P_{Success,i} \times (T_{Hold,i} + T_{Rest}) \quad (1)$$

where $B_{Rcv,i}$ is the modulation bit rate of a packet received by the apparatus performing the PLC channel estimation during communication, $P_{Success,i}$ is a ratio that a packet received by the apparatus performing the PLC channel estimation is decoded without errors during communication, $T_{Hold,i}$ is a time ratio that the apparatus performing the PLC channel estimation occupies the channel, and $T_{Rest}$ is a time ratio that no apparatus uses the channel.

When no apparatus in the PLC network communicates, the available bandwidth of the channel is calculated by using the following equation 2:

$$B_{Max} \quad (2)$$

where $B_{Max}$ is the maximum modulation bit rate in a system.

When the apparatus performing the PLC channel estimation does not use the channel and other PLC apparatuses are using the channel for communication, the available bandwidth of the channel is calculated by using the following equation 3:

$$T_{Rest} \times \frac{\sum_{j=0}^{N-1} [B_{Rcv,j} \times P_{Success,j} \times T_{Hold,j}]}{\sum_{j=0}^{N-1} T_{Hold,j}} \quad (3)$$

where N is a number of modulation methods used in the PLC network, $T_{Rest}$ is a time ratio that no apparatus uses the channel, $B_{Rcv,j}$ is a modulation bit rate of a packet modulated using a j-th modulation method among N modulation methods, $T_{Success,j}$ is a ratio that a packet modulated using a j-th modulation method among N modulation methods is decoded without errors, and $T_{Hold,j}$ is a time ratio that a packet modulated using a j-th modulation method uses the channel.

After the available bandwidth of the channel is calculated according to the equations described above, if the calculated bandwidth is equal to or greater than a reference bandwidth, it is determined that the channel condition is good.

If the channel condition is not good, packet aggregation is not performed and ordinary data transmission is performed in operation S140.

If the channel condition is good, it is determined whether or not packet aggregation is applied with respect to the characteristics of an application at an application level in operation S120.

In an embodiment of the present invention, types of data are divided into class A type and class B type. Class A type data has a large packet size for data desired to be transmitted, and a maximum delay requirement in a network is long. The maximum delay requirement is a requirement that a maximum delay in a network should be equal to or less than a predetermined value. In the case of class A type data, since the maximum delay requirement is long, a long delay in a network is acceptable. Accordingly, class A type data is suitable for packet aggregation. Examples of class A type data include content for high definition televisions (HDTVs), and MPEG data. If the data desired to be transmitted is class A type data, packet aggregation is performed in operation S130 and the data is transmitted in operation S140.

Class B type data has a small packet size for data desired to be transmitted, and a maximum delay requirement in a network is short. Accordingly, a long delay in a network is not acceptable for class B type data. If packet aggregation is applied to Class B type data, a delay in a network occurs. Accordingly, class B type data is not suitable for packet aggregation. Examples of class B type data include data for voice over Internet protocol (VoIP), and contents for interactive games.

If the data desired to be transmitted is class B type data, packet aggregation is not performed and ordinary data transmission is performed in operation S140.

As described above, since the decision to aggregate packets is determined according to the channel condition at a physical level and the type of data at an application level, packet aggregation can be performed in appropriate response to the frequently changing condition of a channel and the characteristic of the data desired to be transmitted. Accordingly, by using the packet aggregation method according to the current embodiment of the present invention, the transmission efficiency of the channel can be enhanced and the quality of service (QoS) can be guaranteed compared to a conventional packet aggregation method in which packet aggregation is uniformly applied.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the method and apparatus for packet aggregation in a PLC network of the present invention, since a decision on whether or not to aggregate packets is determined according to the channel condition at a physical level and the type of data at an application level, packet aggregation can be performed in appropriate response to the frequently changing condition of a channel and the characteristic of the data desired to be transmitted. Accordingly, transmission efficiency of the channel can be enhanced and quality of service (QoS) can be guaranteed compared to a conventional packet aggregation method in which packet aggregation is uniformly applied.

What is claimed is:

1. A method of aggregating packets in a power line communication (PLC) network comprising:
   by performing a PLC channel estimation, determining whether or not a channel condition is good, at a channel condition determination unit;

if the channel condition is good, determining whether or not data desired to be transmitted is suitable for packet aggregation according to the type of data, at a data type determination unit; and if the channel condition is good and the data desired to be transmitted is suitable for the packet aggregation, aggregating packets of the data desired to be transmitted, at a packet aggregation unit, wherein the determining of whether or not the channel condition is good comprises:

calculating the available bandwidth of the channel by using a predetermined formula according to whether or not an apparatus performing the PLC channel estimation uses a channel; and if the available bandwidth of the channel is equal to or greater than a reference bandwidth, determining that the channel condition is good.

2. The method of claim 1, wherein the calculating of the available bandwidth of the channel comprises calculating the available bandwidth of the channel by using the following formula if the apparatus performing the PLC channel estimation communicates by using the channel:

$$B_{Rev,i} \times P_{Success,i} \times (T_{Hold,i} + T_{Rest})$$

where $B_{Rev,i}$ is the modulation bit rate of a packet received by the apparatus performing the PLC channel estimation during communication, $P_{success,i}$ is a ratio that a packet received by the apparatus performing the PLC channel estimation is decoded without errors during communication, $T_{Hold,i}$ is a time ratio that the apparatus performing the PLC channel estimation occupies the channel, and $T_{Rest}$ is a time ratio that no apparatus uses the channel.

3. The method of claim 1, wherein the calculating of the available bandwidth of the channel comprises determining a maximum modulation bit rate as the available bandwidth of the channel when no apparatus in the PLC network performs communication.

4. The method of claim 1, wherein the calculating of the available bandwidth of the channel comprises calculating the available bandwidth of the channel by using the following formula if the apparatus performing the PLC channel estimation does not use the channel and other PLC apparatuses use the channel:

$$T_{Rest} \times \frac{\sum_{j=0}^{N-1}[B_{Rcv,j} \times P_{Success,j} \times T_{Hold,j}]}{\sum_{j=0}^{N-1} T_{Hold,j}}$$

where N is a number of modulation methods used in the PLC network, $T_{Rest}$ is a time ratio that no apparatus uses the channel, $B_{Rev,j}$ is a modulation bit rate of a packet modulated using a j-th modulation method among N modulation methods, $T_{Success,j}$ is a ratio that a packet modulated using a j-th modulation method among N modulation methods is decoded without errors, and $T_{Hold,j}$ is a time ratio that a packet modulated using a j-th modulation method uses the channel wherein N is an integer.

5. A non-transitory computer readable recording medium having embodied thereon a computer executable program for executing a method of aggregating packets in a power line communication (PLC) network, wherein the method comprises:

by performing a PLC channel estimation, determining whether or not a channel condition is good;

if the channel condition is good, determining whether or not data desired to be transmitted is suitable for packet aggregation according to the type of data; and if the channel condition is good and the data desired to be transmitted is suitable for the packet aggregation, aggregating packets of the data desired to be transmitted wherein the determining of whether or not the channel condition is good comprises:

calculating the available bandwidth of the channel by using a predetermined formula according to whether or not an apparatus performing the PLC channel estimation uses a channel; and if the available bandwidth of the channel is equal to or greater than a reference bandwidth, determining that the channel condition is good.

* * * * *